Figure 1:
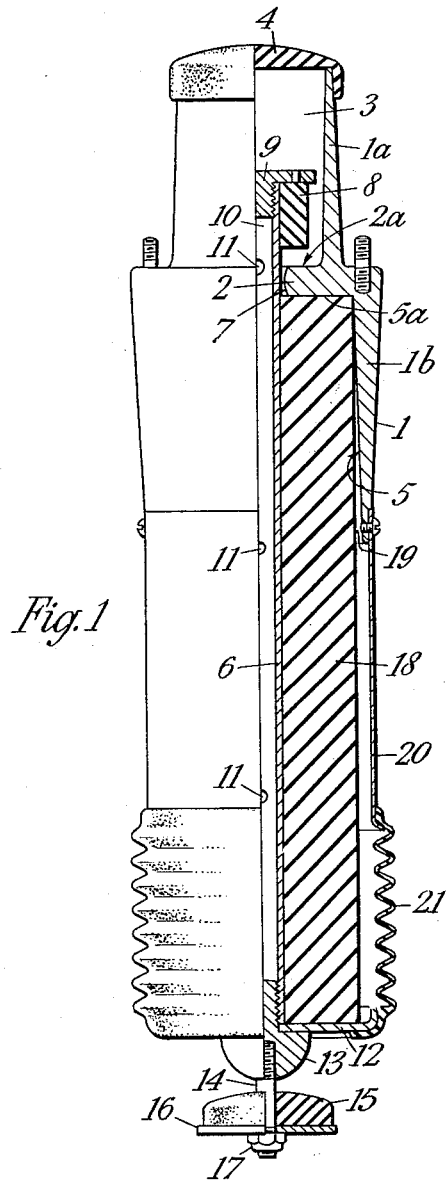

Aug. 21, 1956 R. M. SEDDON 2,759,724
SHOCK ABSORBERS
Filed July 21, 1953 2 Sheets-Sheet 1

INVENTOR
Robert Maxwell Seddon
by Benj. T. Rauber
his attorney

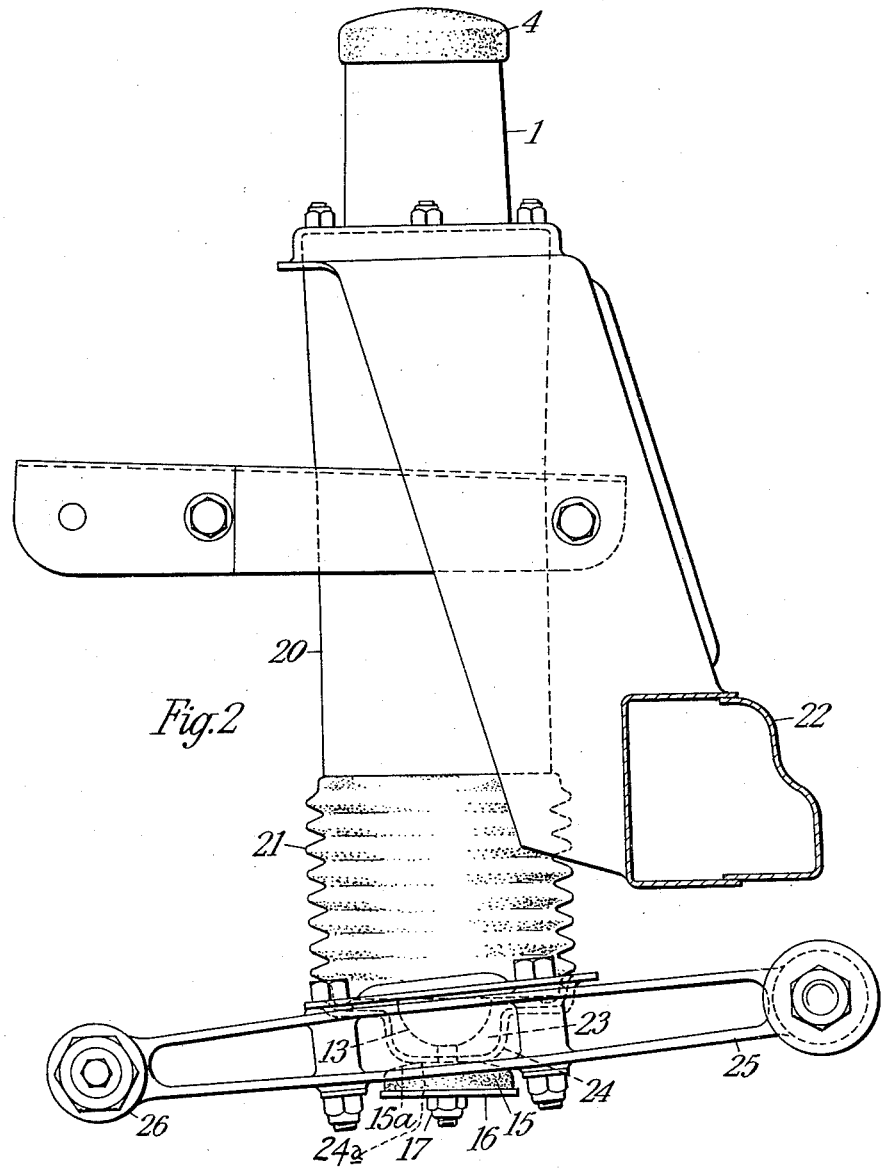

United States Patent Office 2,759,724
Patented Aug. 21, 1956

2,759,724
SHOCK ABSORBERS

Robert Maxwell Seddon, Walmley, Sutton Coldfield, England, assignor to Dunlop Rubber Company Limited, London, England, a British company Application July 21, 1953, Serial No. 369,337

Claims priority, application Great Britain August 16, 1952

7 Claims. (Cl. 267—63)

My invention relates to shock absorbers and provides a shock absorber having means for self-oiling, and one in which the spring rate, i. e. load per unit deflection is automatically variable with the load.

In my invention a shock absorber comprises a tubular inner member, an outer coaxial hollow-section telescopic member having at one end an oil reservoir into which an end of the inner member projects, a hollow-section rubber cushioning element compressible between abutments associated with the inner and outer members, said element being mounted on and making a close fit around the inner member under static load and a clearance fit under a predetermined shock-load, and passageways for the flow of oil from the reservoir into the inner member and from said member into said clearance space when the shock absorber is compressed under said predetermined shock-load.

Preferably an abutment is provided which surrounds the rubber cushioning element whereby upon compression of the element during operation of the shock absorber the element expands radially into contact with the abutment, the effective length of the element being consequently reduced so that the load per unit deflection is increased, a greater resistance being offered to deflection of the shock absorber as the load is increased. The surrounding abutment may be frusto-conically shaped and the element may be tubular so that varying degrees of compression of the element cause more or less of the element to contact the frusto-conical abutment. Alternatively the same effect may be obtained by the co-operation of a frusto-conical element with a surrounding tubular abutment.

Shock absorbers are described in British Patent 663,195 and in my co-pending United States Patent No. 2,683,034, dated July 6, 1954, in which the rubber cushioning element has an internal cross-sectional area in the unstressed condition less than the external cross-sectional area of the inner member, so that when the element is compressed under a load equal to the maximum the element is designed to support, the internal cross-sectional area of the element—for substantially that portion of its length not contacting the outer member—is greater than the external cross-sectional area of the inner member.

One embodiment of the invention will now be described with reference to the accompanying drawings in which Figure 1 shows in part cross-section a shock absorber in accordance with the invention, and Figure 2 shows in side elevation, the shock absorber illustrated in Figure 1 incorporated in an independent wheel suspension system for a motor vehicle.

The shock absorber illustrated in Figure 1 comprises an outer member 1 divided into two parts. The outer member is of hollow cross-section and is divided centrally by an integral annular shaped abutment 2 one half 1a of the outer member being tubular in shape and constituting an oil reservoir 3 and having a removable cap 4 and the other half of the outer member being substantially tubular in shape but having a frusto-conically shaped interior 5, the minor diameter portion 5a of this half of the outer member being located adjacent to the annular abutment 2. A tubular inner member 6 is located coaxially within the outer member 1, one end of the inner member projecting through a clearance hole 7 in the abutment 2 into the oil reservoir 3 and carrying an annular rubber recoil buffer 8 secured to the end of the inner member by means of a screw-threaded plug 9 which screws into the bore 10 of the tubular inner member. The inner member is provided with three oil holes 11 drilled in its wall, one of the holes being drilled in the portion of the inner member located, when the shock absorber is statically loaded (as shown in Figure 1), level with the face of the abutment forming the base of the reservoir, the remaining holes being drilled in spaced apart relationship along the remainder of its length.

The end of the inner member remote from the recoil buffer 8 is provided with flanged abutment 12 and a hemispherical metal alloy bearing 13 which is rigidly attached to the inner member and serves to retain the abutment on the inner member. The hemispherical bearing 13 is provided with an axially-extending stud 14. An annular rubber buffer 15 with one face part-spherically shaped, is retained on the stud by means of a locking nut 17, the buffer co-operating with the wheel suspension illustrated in Figure 2 as will be later described.

A tubular rubber cushioning element 18 which when unstressed has a bore which is smaller than the outside diameter of the inner member 6, is compressed to about 74% of its original length and assembled on the inner member, one end face of the cushioning element contacting the annular abutment 2 forming part of the outer member and the other end face contacting the flanged abutment 12 associated with the inner member. The cushioning element is retained in the shock absorber in a pre-compressed state and the bore of the cushioning element firmly grips the inner member. The degree of pre-compression of the element is such that when the element is further compressed under shock load the element expands radially and a clearance space is formed between the inner member and the bore of the element. When the cushioning element is assembled and pre-compressed, the outside diameter thereof is equal to the minor diameter of the frusto-conical interior of the outer member 1, a space 19 of gradually increasing width being formed between the outer surface of the element, and the frusto-conical interior, the width of the space being of maximum value adjacent to the end of the outer member. A cylindrically shaped metal cover 20 is attached coaxially to the outer member and extends from the outer member over the cushioning element 18 and projects towards the flanged abutment 12. A space, which allows for relative movement of the inner and outer members, is formed between this cylindrical cover and the flanged abutment and is covered by a substantially cylindrical flexible rubber bellows 21 attached to one end of the cylindrical cover and at the other end to the flanged abutment.

The shock absorber is designed for vertical mounting, with the oil reservoir uppermost (see Fig. 2), the outer member being rigidly attached to a longitudinally extending chassis member 22. The part-spherical bearing at the other end of the shock absorber fits into a natural rubber cup bearing 23 supported in a housing 24 incorporated in a wishbone 25 pivotally attached to a longitudinal chassis member. The wishbone carries a wheel assembly at its free end 26. The hemispherical surface 15a of the buffer 15 associated with the end of the inner member abuts the face 24a of the bearing housing on its side remote from the rubber cup bearing 23 and is adapted to rock on this face during arcuate movement of the wishbone, the buffer being retained in position on the inner member by means of the locking nut 17.

When the shock absorber is mounted on a vehicle as just described, and when it is under static load, the buffer 8 located in the oil reservoir 3 is spaced apart from the annular abutment 2 and the top oil hole is level with the abutment face 2a.

The shock absorber before use is filled with oil which flows into the reservoir 3, filling the tubular inner member 6 and part-filling the reservoir.

When the shock absorber is compressed the outside diameter of the cushioning element 18 increases along substantially its whole length and the rubber adjacent to the annular abutment 2 is displaced so as to contact the wall of the frusto-conical interior 5 of the outer member. Thus the effective length of the cushioning element is reduced and the load per unit deflection is increased so that an increased resistance is offered to further deflection of the shock absorber. The greater the compression of the shock absorber the more of the outer surface of the cushioning element contacts the frusto-conical interior and the greater the resistance of the shock absorber to further deflection.

After a pre-determined compression of the cushioning element the bore of the cushioning element increases in diameter so that a space is formed between the inner member and the bore of the cushioning element. Oil will then flow from the bore 10 of the tubular member through the laterally extending holes 11 formed in the inner member and into the space formed between the cushioning element and the inner member so as to lubricate the mutually contacting surfaces and reduce the frictional forces set up when the shock absorber is operated. Oil will flow simultaneously from the reservoir through the upper hole formed in the inner member and into the bore 10 thereof to replace that which flows into the space. On contraction of the shock absorber, the bore of the cushioning element once more contracts onto the outer member and oil flows back from the space into the bore 10 of the inner member, some oil being thereby displaced into the reservoir 3.

Having described my invention what I claim is:

1. A shock absorber comprising a hollow tubular inner member closed at its lower end to form a lubricant reservoir and having an outwardly extending lower abutment at its lower end, an outer hollow telescopic member coaxial with said inner member and of a diameter to form a closed chamber of annular section about said inner member, said outer member having an inwardly extending upper abutment near its upper end and spaced above said lower abutment, a hollow section, rubber, cushioning element compressible between said upper and lower abutments, said element being mounted on and making a close fit around the inner member under static load and a clearance fit under a predetermined shock load, said inner member having passageways for the flow of lubricant from the interior of said inner member into and out of said clearance.

2. A shock absorber according to claim 1 in which the outer hollow member has an abutment surrounding at least a part of the cushioning element such that, upon compression of the element beyond the static load, the cushioning element expands radially into contact with the latter abutment, additional amounts of compression causing greater proportions of the element to contact the latter abutment.

3. A shock absorber according to claim 2 wherein the said latter abutment is frusto-conically shaped, the minor diameter portion thereof being located adjacent to the end of the shock absorber element.

4. A shock absorber according to claim 1 having a compressible rubber buffer mounted on the end of the inner member located within the oil reservoir and compressible between an end of the inner member and the abutment associated with the outer member.

5. A shock absorber comprising a tubular inner lubricant storage reservoir closed at its lower end and having at its lower end an outward flanged abutment, an outer hollow telescopic member enclosing and co-axial with said inner member and having at its upper end an upper lubricant reservoir into which the upper part of the inner storage reservoir projects and having an annular abutment extending inwardly below said upper lubricant reservoir, a hollow-section rubber cushioning element compressible between said abutments, said element being mounted on and making a close fit around the inner lubricant storage reservoir under static load and a clearance fit under a predetermined shock load, said tubular inner lubricant storage reservoir having passageways for the flow of oil from the upper lubricant reservoir into the inner lubricant storage reservoir and from said inner lubricant storage reservoir into said clearance space when the shock absorber is compressed under said predetermined shock-load and a connecting wall from said outer member to the flanged abutment of said inner lubricant storage reservoir freely contractible and extensible upon relative longitudinal movement of said inner lubricant storage reservoir and outer member.

6. The shock absorber of claim 5 in which the inner surface of said outer member diverges downwardly from circumferential contact with said cushioning element.

7. A shock absorber comprising a hollow tubuluar inner member closed at its lower end to form a lubricant reservoir and having an outwardly extending lower abutment at its lower end, an outer hollow telescopic member co-axial with said inner member and of a diameter to form a closed chamber of annular section about said inner member, said outer member having an inwardly extending upper abutment near its upper end and spaced above said lower abutment and extending above said abutment to form a lubricant chamber, a hollow section, rubber, cushioning element compressible between said upper and lower abutments, said element being mounted on and making a close fit around the inner member under static load and a clearance fit under a predetermined shock load, said inner member having passageways for the flow of lubricant from the interior of said inner member into and out of said lubricant chamber and said clearance.

References Cited in the file of this patent

UNITED STATES PATENTS

| | | |
|---|---|---|
| 1,653,122 | Ray | Dec. 20, 1927 |
| 2,334,597 | Badertscher | Nov. 16, 1943 |
| 2,445,723 | Brown | July 20, 1948 |
| 2,566,985 | Gee | Sept. 4, 1951 |
| 2,574,788 | Janeway et al. | Nov. 13, 1951 |
| 2,683,034 | Seddon | July 6, 1954 |

FOREIGN PATENTS

| | | |
|---|---|---|
| 145,884 | Australia | Feb. 9, 1950 |
| 685,524 | France | Apr. 1, 1930 |